United States Patent [19]
Heiland

[11] 3,746,409
[45] July 17, 1973

[54] SUBSTANTIALLY RIGID BEARING FOR ROTARY BODIES

[75] Inventor: Manfred Heiland, Hahn/Pfungstadt, Germany

[73] Assignee: Firma Carl Schenck Maschinenfabrik GmbH, Darmstadt, Germany

[22] Filed: Nov. 19, 1971

[21] Appl. No.: 200,409

[30] Foreign Application Priority Data
Aug. 20, 1971 Germany............... P 21 41 792.5

[52] U.S. Cl. ............................................. 308/15
[51] Int. Cl. ......................................... F16c 35/00
[58] Field of Search............................. 308/15, 26

[56] References Cited
UNITED STATES PATENTS
| | | | |
|---|---|---|---|
| 2,869,936 | 1/1959 | Federn | 308/15 |
| 3,427,081 | 2/1969 | Dellinger | 308/15 |
| 2,751,262 | 6/1956 | Federn et al. | 308/26 |

FOREIGN PATENTS OR APPLICATIONS
1,044,531  1/1954  Germany............... 308/15

Primary Examiner—Charles J. Myhre
Assistant Examiner—Barry Grossman
Attorney—W. G. Fasse

[57] ABSTRACT

A substantially rigid bearing for rotating bodies is anchored with rods to a base or foundation, whereby the rods extend in a common plane perpendicularly to the main bearing axis. The rods restrain the bearing housing or head from rotational movement about said axis, as well as from any radial movements relative to said axis but permit a wobbling movement which causes forces in the direction of said main bearing axis. To control these forces, a plurality of spring means are provided extending substantially in parallel to said main axis and connecting said bearing housing or head to a rigid support without interfering substantially with said wobbling movement.

11 Claims, 3 Drawing Figures

SUBSTANTIALLY RIGID BEARING FOR ROTARY BODIES

BACKGROUND OF THE INVENTION

The invention relates to substantially rigid bearings for rotating bodies, more specifically, for balancing machines.

Apparatus or equipment in which a rotating body such as a rotor may be subject to substantial radial deflections especially at critical revolutions per minute requires bearings or supporting means for such rotors which are capable to follow such rotor motions or deflections in order to avoid harmful forces between a shaft and the bearing. This is especially so in connection with balancing machines in which relatively long bodies with elastic shafts are to be tested or examined at revolutions per minute above a critical limit.

A substantially rigid bearing for rotating bodies is known which is rigid in radial directions as mentioned but which permits in an elastically yielding manner the wobbling motions of the rotational axis of the rotor which are the result of the bending of said shaft. In other words, each bearing is radially rigid and without play but constructed so as to yield elastically in a spherical manner so to speak, that is the construction of the bearing permits bearing motions about its vertical and horizontal axis but not radially thereto. Each bearing is secured against such radial movements by means of a spring rod system which is arranged in a plane extending through the center of the bearing and perpendicularly relative to the main axis of the bearing. Each of these spring rod systems comprises several spring rods arranged in parallel to each other and preferably at equal spacings from the bearing main axis. The spring rods are rigid relative to tensile stress, pressure, and buckling forces, but they are relatively bendable in order to permit said wobbling motions. Due to the rigidity relative to stress, pressure, and buckling the spring rods secure the bearing head or housing against rotational movements about the main bearing axis and against movements in all radial directions whereby the bearing head is uniformly restrained in all of said radial directions but whereby said wobbling motions of the rotational axis of the rotor are permitted.

A rotor bearing, as described above, is, for instance, known from German Pat. No. 1,045,736. This publication further teaches to restrain the degree of freedom of such a bearing also in the direction of the bearing main axis, that is, to restrain axial movements of the bearing head by means of slanted supporting rods which are located in a plane extending through the center of the bearing. Due to the slanted position of these supporting rods relative to the radial plane of the bearing, which rods are otherwise rigid relative to tensile stress, pressure, and buckling forces, it is possible to take up forces which are effective in the direction of the bearing main axis. Supporting rods extending perpendicularly to the rotational axes which corresponds to said bearing main axis, would not be effective for taking up forces extending in the direction of said axis. Furthermore, a supporting rod extending in the direction of the rotational axis would prevent supporting different types of rotors to be tested into the bearing. Therefore, such a supporting rod would not be feasable due to practical considerations.

The above described known slanting of the supporting rods for taking up axial forces, however, has a substantial disadvantage because, especially in connection with large bearing structures or supports, it is rather involved to provide connecting points for slanted supporting rods at the bearing head as well as at the bearing base. Overcoming these difficulties increases the price for such bearing structures in an undesirable manner.

OBJECTS OF THE INVENTION

In view of the above, it is the aim of the invention to achieve the following objects singly or in combination:

to remove the outlined difficulties, more specifically to avoid the use of slanted bearing supporting rods;

to provide means for axially supporting the bearing head or housing in addition to its radial and rotational supporting means;

to provide spring means which have force components effective in the direction of the main bearing axis or rather in parallel thereto for permitting said wobbling motions in predetermined limits;

to provide axially effective spring means which are adjustable with regard to their effectiveness for controlling said wobbling motions; and to provide interconnecting means between said bearing head and rigid support means which are rigidly effective within predetermined limits and which permit said spring means to become effective above said predetermined limits.

SUMMARY OF THE INVENTION

The above objects have been achieved according to the invention in a bearing which is rigidly secured against radial and rotational movements by means of spring rods extending perpendicularly relative to the bearing main axis and in a plane which in turn extends through the center of said bearing, wherein axial forces are controlled by means of a plurality of springs exerting spring forces in parallel to the bearing main axis in such a manner that wobbling motions are controlled within predetermined limits without unduly interferring with said wobbling motions.

According to a preferred embodiment of the invention, the spring means are arranged in parallel to the bearing main axis and as close thereto as possible, whereby the individual springs are evenly distributed along the generatrix of a cylinder, the longitudinal axis of which coincides with the bearing main axis and thus with the rotational axis of the rotor to be supported by said bearing.

The invention further teaches to select the stiffness of said spring means or their lever arms relative to the center of the bearing in such a manner that the respective restoring moments for the wobbling motions of the bearing head are equal relative to two degrees of freedom or axes of freedom, that is axes in which said wobbling motions are possible.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EMBODIMENTS

Figure 1:
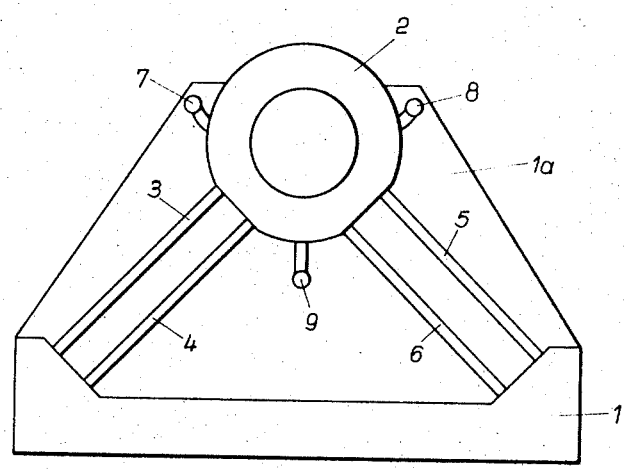
FIG. 1 is a front plan view of a bearing and its supporting structure according to the invention.
Figure 2:
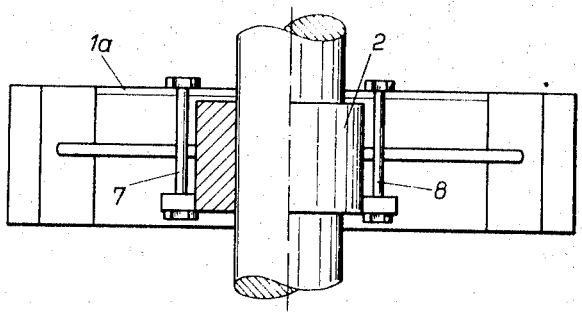
FIG. 2 is a top view onto the bearing as shown in FIG. 1, partially in section.

As shown in FIGS. 1 and 2, a bearing housing or head 2 is supported on a base or foundation structure 1 by means of spring rods 3,4,5, and 6. These spring rods are substantially rigid with regard to tensile stress, pressure, and buckling forces. However, the spring rods are bendable in the direction of the longitudinal axis of the shaft shown in FIG. 2 which axis simultaneously constitutes the bearing main axis. The rods 3, 4, 5, and 6 are located in a plane which extends through the center of the bearing and perpendicularly to said main or rotor axis. By making these rods sufficiently rigid, it is possible to restrain rotational movements of the bearing head 2 about said main axis as well as movements of such head in any direction extending radially relative to said main axis. However, due to the fact that the rods are bendable and due to the further fact that they are located in a single plane extending perpendicularly to the main axis, these rods permit so called wobbling or tumbling motions about a vertical and horizontal axis.

According to the invention, there are provided means for restraining axial bearing movements. These means comprise a vertical support such as a rigid wall 1a, the lower edge of which is rigidly connected to the base 1 and which extends perpendicularly to said main axis. These axial restraining means further comprise a plurality of spring means such as helical or spiral springs or springs known as disk or cup springs. These springs 7, 8, and 9, for example, are connected between said upright support wall 1a and the bearing head 2, whereby the springs extend preferably in parallel to said bearing main axis. These springs, for example, three of which are shown, are relaxed when the bearing head 2 is in its normal position. It is also possible to arrange the springs in such a manner that at least effective force components are effective in parallel to such main axis, whereby the springs themselves are arranged at an angle to said main axis. Moreover, it is perferable that these springs are arranged as close as possible to the rotor axis in order to impede or hinder the wobbling or tumbling motions of the bearing head 2 as little as possible.

It is an advantage of the invention to maintain an equal torsional rigidity relative to all axes extending perpendicularly to the axis of the rotor to be tested simply by using three or more spring units and by suitably selecting their spacing from the bearing main axis, as well as by suitably selecting their spring stiffness.

In the embodiment of FIGS. 1 and 2, the spring means are connected with one end to the bearing head 2 by means of arms 10 which are connected to one end of the bearing head 2. However, the arms 10 may also be connected to the bearing head 2, intermediate its ends as will be described in more detail below with reference to FIG. 3. In this embodiment, helical springs or packages of cup springs are especially suitable which may be arranged relative to a center plane so as to be effective on both sides of said center plane. The springs may also be arranged at an angle relative to the main axis provided that sufficient spring force components are effective in the direction of said main axis.

As mentioned above, the yieldability of the bearing head relative to wobbling motions of the body to be tested is desirable, especially because this enables the bearing head to adapt itself to any rotor deflections with a minimum of wedging effects. In addition, wobbling motions of the bearing head itself are also desirable because this obviates the need for a large precision in the alignment of the bearing heads relative to each other when assembling or constructing a testing facility or a balancing machine. The invention achieves these advantages with surprisingly simple elements.

In addition, the bearing according to the invention provides the possibility of statically aligning the bearing head or housing 2 relative to rotational or tumbling motions about a vertical and horizontal axis by making the connecting means which connect the springs 7, 8, and 9 to the vertical support wall 1a adjustable in the longitudinal direction of the spring means.

Figure 3:
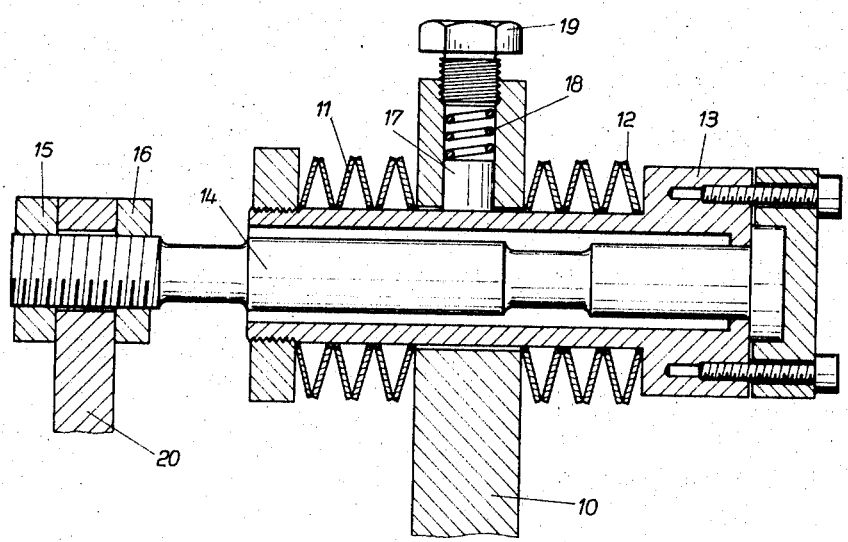
FIG. 3 is a sectional view on an enlarged scale through anyone of the axial bearing support means shown in FIGS. 1 and 2.

A practical embodiment of said adjustable spring mounting is shown in FIG. 3. This arrangement comprises two connecting means, namely first connecting means for connecting the spring to the housing 2 and second connecting means for the interconnection to the upright supporting wall 1a. The first connecting means comprise said arm 10, one end of which is connected to the bearing head 2, preferably intermediate its ends. The other end of the arm 10 is provided with an aperture through which a sleeve 13 extends. The second connecting means comprise a rod 14 extending through the sleeve 13. One end of the rod is secured to the sleeve, as shown at the right hand side of FIG. 3, whereas the other end of the rod 14 is provided with a thread extending through an aperture in the wall 1a. Nuts 15 and 16 are engaged with the threaded end of the rod 14 whereby the rod 14 and with it the sleeve 13 are axially adjustable back and forth in the aperture at the outer end of the arm 10.

As mentioned, the spring means 7, 8, and 9 may comprise disk or cup springs 11 and 12 supported on the sleeve 13 as shown in FIG. 3. For this purpose, the sleeve is provided with a fixed shoulder at one end thereof and with a releasable shoulder at the other end thereof. The releasable shoulder may, for instance, be threaded to the other end of the sleeve 13. Thus, the springs 11 are arranged on one side of the supporting arm 10, while the springs 12 are arranged on the other side of the supporting arm 10, whereby the sleeve 13 is permitted to shift axially back and forth relative to the arm 10.

The embodiment shown in FIG. 3 provides means for statically aligning the bearing head 2 in an angular position relative to a vertical and horizonal axis. As mentioned, this has the special advantage that high precision alignments between the several bearing heads of a testing facility have been obviated with substantial savings in cost.

It may also be desirable to select springs with nonlinear spring characteristics in order to achieve a nonlinear damping of the tumbling motions of the bearing head 2.

Referring further to FIG. 3, there are shown means for rigidly connecting the bearing head 2 to the supporting wall 1a, while simultaneously eliminating the effectiveness of the springs 11 and 12 within predetermined limits of the forces which provide said rigid interconnection. For this purpose the arm 10 is provided at its outer end with adjustable wedging means. These means comprise an axial bore extending from the outer end of the arm 10 toward the aperture through which the sleeve 13 extends. A shim 17 is located in said axial bore in contact with said sleeve 13. A spring 18 presses the shim 17 against the sleeve 13 subject to the adjustment of a set screw 19. If the set screw 19 is sufficiently tightened, the springs 11 and 12 become ineffective and a rigid connection is established between the bearing head 2 and the base 1 through the rod 14 and the rigid wall 1a.

The arrangement according to FIG. 3 operates as follows. If the moments effective upon the bearing head 2 exert forces which are larger than the frictional force between the shim 17 and the sleeve 13, such moments overcome the frictional forces and the frictional interconnection becomes a gliding connection where after the axial stiffness of the bearing is determined by the disk spring sets 11 and 12. This feature of the invention has the special advantage that the shim 17 is in frictional contact with the sleeve 13, even during such a sliding relative movement whereby energy is removed from the system. In this manner undesirable tumbling motions of the bearing head 2, for example self excited tumbling motions of the bearing head are dampened and maintained within permissable limits.

Incidentally, the limits for permissable wobbling motions are determined by the size and bearing capacity of any particular bearing as well as by the end pressures permissable for any particular bearing.

Although the invention has been described with reference to specific example embodiments, it is to be understood that it is intended to cover all modifications and equivalents within the scope of the appended claims.

I claim:

1. A substantially rigid bearing for a rotary body, said bearing having a bearing center and a main axis extending through said center, comprising base means, bearing head means, a spring rod system comprising a plurality of spring rods connected to said bearing head means and to said base means, said spring rods being located in a plane extending through said bearing center and perpendicularly to said main bearing axis, said spring rods being rigid with regard to tensile strain, pressure and buckling but bendable in at least one section thereof whereby the bearing head means are secured to said base means against rotation about said main bearing axis and with uniform rigidity against any radial movement relative to said main bearing axis, said spring rods permitting a wobbling motion of said rotary body along axes extending perpendicularly to each other and to said main axis as well as through said bearing center, a plurality of spring means, a support rigidly connected to said base means and extending substantially perpendicularly relative to said main axis, said plurality of spring means being operatively interposed between said support and said bearing head means, said plurality of spring means exerting force components in parallel to said main axis and of such strength that said wobbling motion is permitted within predetermined limits, and wherein said plurality of spring means have a longitudinal axis, said bearing further comprising mounting means for said plurality of spring means, said mounting means comprising first connecting means for operatively connecting said spring means to said bearing head means, and second connecting means for operatively connecting said spring means to said support, said second connecting means comprising adjusting means for adjusting said second connecting means in said longitudinal axis of said spring means.

2. The bearing according to claim 1, wherein said plurality of spring means are arranged in parallel to said main axis of said bearing head means.

3. The bearing according to claim 2, wherein said plurality of spring means are distributed evenly about a cylinder generatrix of a cylinder having a longitudinal axis coinciding with said main bearing axis, and as close to said main bearing axis as possible.

4. The bearing according to claim 1, wherein each of said plurality of spring means has a stiffness which provide equal restoring moments for said wobbling motions relative to two degrees of freedom.

5. The bearing according to claim 1, wherein said plurality of spring means are arranged so that said force components are effective at a respective lever arm relative to said center that equal restoring moments are provided for said wobbling motions relative to two degrees of freedom.

6. The bearing according to claim 1, wherein said plurality of spring means have a non-linear spring characteristic.

7. The bearing according to claim 1, wherein said first connecting means comprise, for each of said plurality of spring means, a connecting arm connected at one end thereof to said bearing head means, an aperture through said arm at its other end, a sleeve extending through said aperture, means for securing said spring means on said sleeve, said second connecting means comprising a rod extending through said sleeve, means for securing one end of said rod to said sleeve, said adjusting means comprising an aperture in said support, said rod having another, threaded end extending through said aperture in said support, and means for engaging said threaded end of the rod to adjust and secure it relative to said support.

8. The bearing according to claim 7, wherein said rod extends in parallel to said main bearing axis.

9. The bearing according to claim 7, wherein said plurality of spring means comprise a plurality of disk springs supported on said sleeve on either side of said connecting arm, said sleeve comprising fixed shoulder means at one end thereof and releasable shoulder means secured to the other end of said sleeve, said disk springs pressing against said shoulder means.

10. The bearing according to claim 7, wherein said first connecting means comprise means for substantially rigidly interconnecting said arm and said sleeve whereby said bearing head means is connected to said support, and whereby the effect of said plurality of spring means is eliminated.

11. The bearing according to claim 10, wherein said interconnecting means between said arm and said sleeve comprise a bore extending longitudinally through said arm to said aperture through which the sleeve extends, a shim in said bore in contact with said shim, sleeve, a helical spring in said bore in contact with said shim, a threaded end in said bore remote from said sleeve and a set screw in said threaded end for forcing the spring and shim against the sleeve whereby a frictional connection between the sleeve and the arm is established which is effective within predetermined force limits adjustable by said set screw and which permits sliding movements between the sleeve and the arm when said limits are exceeded.

* * * * *